United States Patent
Martin

(10) Patent No.: US 12,473,800 B1
(45) Date of Patent: Nov. 18, 2025

(54) COMPOSITION AND METHODS FOR INHIBITING CORROSION OF METAL DURING ACIDIZING A WELLBORE IN A SUBTERRANEAN FORMATION FOR FRACKING

(71) Applicant: Roy W Martin, Naples, FL (US)

(72) Inventor: Roy W Martin, Naples, FL (US)

( * ) Notice: Subject to any disclaimer, the term of this patent is extended or adjusted under 35 U.S.C. 154(b) by 0 days.

(21) Appl. No.: 19/170,589

(22) Filed: Apr. 4, 2025

Related U.S. Application Data

(60) Provisional application No. 63/773,577, filed on Mar. 18, 2025, provisional application No. 63/771,796, filed on Mar. 14, 2025, provisional application No. 63/742,905, filed on Jan. 8, 2025.

(51) Int. Cl.
*E21B 41/02* (2006.01)
*C09K 8/54* (2006.01)
*C09K 8/74* (2006.01)
*E21B 43/11* (2006.01)

(52) U.S. Cl.
CPC .............. *E21B 41/02* (2013.01); *C09K 8/54* (2013.01); *C09K 8/74* (2013.01); *E21B 43/11* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 5,697,443 A * | 12/1997 | Brezinski | ............... C23F 11/04 166/307 |
| 7,179,485 B1 | 2/2007 | Schneider | |
| 10,035,944 B2 | 7/2018 | Purdy | |
| 10,190,039 B2 | 1/2019 | Purdy | |
| 10,329,476 B2 | 6/2019 | Purdy | |
| 10,822,535 B2 | 11/2020 | Purdy | |
| 10,982,133 B2 | 4/2021 | Purdy | |
| 11,028,314 B2 | 6/2021 | Gardner | |
| 11,098,241 B2 | 8/2021 | Purdy | |
| 11,130,905 B2 | 9/2021 | Gardner | |
| 11,155,480 B2 | 10/2021 | Moloney | |
| 11,155,481 B2 | 10/2021 | Dhawan | |
| 11,168,246 B2 | 11/2021 | Purdy | |
| 11,248,166 B2 | 2/2022 | Purdy | |
| 11,485,902 B2 | 11/2022 | Purdy | |
| 11,767,375 B2 | 9/2023 | Gardner | |
| 12,018,210 B2 | 6/2024 | Purdy | |

(Continued)

FOREIGN PATENT DOCUMENTS

| CA | 2629744 | 5/2007 |
|---|---|---|

OTHER PUBLICATIONS

U.S. Appl. No. 12/321,629, US20100189630, U.S. Pat. No. 7,927,509, Apr. 19, 2011.

(Continued)

*Primary Examiner* — Andrew Sue-Ako
(74) *Attorney, Agent, or Firm* — Jeffrey S. Melcher; Melcher Patent Law PLLC

(57) ABSTRACT

Compositions and methods for inhibiting corrosion of metal in a wellbore during acidizing a wellbore in a subterranean formation. The composition comprising novel oxidative coupling products and methods for their synthesis and application.

24 Claims, 6 Drawing Sheets

Theorized General Structures of Quaternary Quinolinium-Quinolinium resulting from Oxidative Coupling Reaction using Nitrous Acid One coupling Two couplings

(56) References Cited

U.S. PATENT DOCUMENTS

| | | | |
|---|---|---|---|
| 2010/0261623 A1* | 10/2010 | Cassidy | C09K 8/74 |
| | | | 558/255 |
| 2014/0116708 A1 | 5/2014 | Wadekar | |
| 2014/0128295 A1 | 5/2014 | Wagles | |
| 2016/0177170 A1* | 6/2016 | Janak | C23F 11/04 |
| | | | 507/242 |
| 2018/0135187 A1* | 5/2018 | Crawford | C23F 11/149 |
| 2021/0108132 A1 | 4/2021 | Trabelsi | |
| 2023/0120003 A1 | 4/2023 | Purdy | |
| 2024/0279533 A1 | 8/2024 | McLoughlin | |

OTHER PUBLICATIONS

U.S. Appl. No. 16/845,163, US 20200239240 filed Apr. 10, 2020 Abandoned.

U.S. Appl. No. 16/864,407, US 20200354218, Nov. 12, 2010 U.S. Pat. No. 11,235,975, Feb. 1, 2022.

U.S. Appl. No. 16/501,355, US 20190300398 Oct. 3, 2019, Abandoned.

U.S. Appl. No. 17/571,715, US 20220240506 Aug. 4, 2022 Abandoned.

U.S. Appl. No. 17/205,316 US20210323838 Oct. 21, 2021.

U.S. Appl. No. 17/571,586 US20220127164 Apr. 28, 2022, U.S. Pat. No. 11,999,644, Jun. 4, 2024.

U.S. Appl. No. 17/866,823 US20220356091 Nov. 10, 2022.

U.S. Appl. No. 17/988,963 US20230080286 Mar. 16, 2023.

U.S. Appl. No. 18/111,656 US20230249996 Aug. 10, 2023.

U.S. Appl. No. 18/140,882 US20230331587 Oct. 19, 2023.

U.S. Appl. No. 18/817,464 US20240425396 Dec. 26, 2024.

U.S. Appl. No. 18,893,141 US20250011191 Jan. 9, 2025.

U.S. Appl. No. 18/768,483.

U.S. Appl. No. 18/768,521.

U.S. Appl. No. 19/208,667.

PCT/US2022/011892 (based on U.S. Appl. No. 17/571,586) WO2022155104.

PCT/US2023/027862 Jul. 17, 2023 ( Based on U.S. Appl. No. 17/866,823) WO2024019951.

PCT/US2021/027441 (based on U.S. Appl. No. 17/205,316) WO2021216347 Oct. 28, 2021.

Yang, "Corrosion ihibition of benzyl quinoline chloride derivative-based formulation for acitizing process," Mar. 2024, SPE Journal, pp. 1483-1491.

Mukhopadhyay, "Applications of sodium nitrite in organic synthesis," ChemPubSoc, Europe, DOI: 10.1002/ejoc.201900951, Eur. J. Org. Chem, 2019, 6424-6451.

Aghanjanzadeh, "Wettability modification of oil-wet carbonate reservoirs using silica-based nanofluid: an experimental approach," Journal of Petroleum Science and Engineering 178(2019) Mar. 23, 2019, Elsevier B.V., pp. 700-710.

Zhou, "Efficient inhibition of montmorillonite swelling through controlling flexibility structure of piperazine-based polyether Gemini quaternary ammonium salts," Chemical Engineering Journal 383 (2020), Oct. 15, 2019, Elsevier B.V,, 123190, pp. 1-12.

Smith, "Deep eutectic solvents (DESs) and their applications," Chemical Reviews, Oct. 10, 2014, 114 American Chemical Society, pp. 11060-11082.

Atilhan, "Review on chemical enhanced oil recovery, Utiliztion of ionic liquids and deep eutectic solvents," Journal of Petroleum Science and Engineering 205(2021) 108746, Apr. 2, 2021, Elsevier B.V., pp. 1-11.

Mohsenzadeh, "Effects of concentration, salinity, and injection scenario of ionic liquids analogue in heavy oil recovery enhancement," Journal of Petroleum Science and Engineering 133(2015) May 9, 2015, Elsevier B.V., pp. 114-121.

Mohsenzadeh, "Investigation of formation damage by deep eutectic solvents as new EOR agents," Journal of Petroleum Science and Engineering 129(2015) Mar. 2, 2015, Elsevier B.V., pp. 130-136.

Buckley, "Mechanisms and Consequences of Wettability Alteration by Crude Oils," Thesis submitted for the Degree of Doctor of Philosphy, Dept. of Petroleum Engineering, Heriot-Watt Univ., Edinburgh, United Kingdom, Sep. 1996, pp. 1-201.

Debashish, "An effective microwave-induced iodine-catalyzed method for the synthesis of quinozalines via condensation of 1,2-diamines with 1,2-dicarbonyl compounds," Molecules 2010, 15, 4207-4212.

Elumalai, "A green, scalable, and catalyst-free one-minute synthesis of qunoalines," 2021, SynOpen 2021, 5, pp. 43-48, george thieme verlag kg, rudigestrassa 14, 70469 stuttgart, germany.

Martin In, "Gemini surfactants and surfactant oligomers," https://hal.science/hal-03767782v1, Sep. 2, 2022, pp. 1-58.

Brycki, "Properties and applications of quarternary ammonium gemini surfatant Dec. 6, 12: an overview," https://doi.org/10.3390/molecules28176336, Molecules 2023, 28, 6336. https://doi.org/10.3390/molecules28176336.

Dehaan, "Secondary Organic Aerosol-Forming Reactions of Glyoxal with Amino Acids." Environmental Science & Technology is published by the American Chemical Society. 1155 Sixteenth Street N.W., Washington, DC 20036 Environ. Sci. Technol. 2009, 43, 2818-2824.

Aljamali, Review on Phenylene diamine (Preparation, Reactions, Biological Applications, Bio-Usesi) International Journal of Innovations in Scientific Engineering (IJISE) 2019, vol. No. 9 , Jan.-Jun. , p. 9-23.

Kleijwegt, "Investigating tertiary amine alkylation/benzylation kinetics with ramp-flow in a plug-flow reactor using in-line 1H NMR spectroscopy," Chemical Engineering Research and Design 1 6 8 ( 2 0 2 1 ) 317-326.

Vasudevan, "Time- and temperature-resolved in-situ NMR studies on simultaneous quaternization/cross-linking of poly (vinylbenzyl chloride) polymer with hexamine," Colloid Polym Sci (2015) 293:3439-3448 DOI 10.1007/s00396-015-3712-7.

Yang, "Corrosion Inhibition of Benzyl Quinoline Chloride Derivative- Based Formulation for Acidizing Process," Mar. 2024 SPE Journal pp. 1483-1491.

Abu-Hashem, "Synthesis, Reactions and Biological Activity of Quinoxaline Derivatives," American Journal of Organic Chemistry 2015, 5(1): 14-56 DOI: 10.5923/j.ajoc.20150501.03.

* cited by examiner

Non-limiting examples of Quaternary Aromatic Corrosion Inhibitors
Suitable as Precursors for producing Oxidative Addition Products Quaternary Pyridinium
Alkyl Derivative Quaternary Quinolinium Theorized General Structures of Quaternary Quinolinium-Quinolinium resulting from Oxidative Coupling Reaction using Nitrous Acid One coupling Two couplings Theorized General Structures of Quaternary Pyridinium-Quinolinium resulting from Oxidative Coupling Reaction using Nitrous Acid SYN #9 vs Alpha 1038
1010 Coupon
Water Rinse and Acetone Wash SYN #9
Uniform adherent film even after acetone wash Alpha 1038
Quaternary quinolinium used to produce SYN #9
Protective film dissolved in acetone exposing a grey coupon
Concentration was approximately 5x that of SYN #9

COMPOSITION AND METHODS FOR INHIBITING CORROSION OF METAL DURING ACIDIZING A WELLBORE IN A SUBTERRANEAN FORMATION FOR FRACKING

FIELD OF THE INVENTION

The invention relates to compositions and methods for inhibiting corrosion of at least metal in a wellbore during acidizing a wellbore in a subterranean formation for fracking and extraction of oil. The metal can be for example a casing of the wellbore, a wireline, or a perforation tool.

BACKGROUND OF THE INVENTION

Corrosion of metal surfaces of the casing of the wellbore, the wireline, or the perforation tool used for fracking caused by acids during acidizing of the wellbore are common problems. Furthermore, it is common practice to remove the perforation tool from the wellbore prior to acidizing of the wellbore to prevent corrosion of the metal surface of the perforation tool.

U.S. Patent Publication No. 20240279533 (McLoughlin) discloses compositions used to reduce corrosion of a casing of the wellbore, a wireline, or a perforation tool in the wellbore caused by acids during acidizing of the wellbore. The perforation tool can remain in the wellbore during the acidizing of the wellbore. The complete disclosure of this publication is incorporated herein by reference.

U.S. application No. 20140116708A1 discloses a water-in-oil emulsion comprising from 50:50 to 80:20 v/v water phase to oil phase. The disclosure further recites addition of corrosion inhibitors including quaternary compounds, cinnamaldehyde, acetylenic alcohols, intensifiers, cuprous ions, and carboxylic acids (i.e. formic acid).

SUMMARY OF THE INVENTION

Quaternary surfactants exemplified by quaternary pyridinium and quaternary quinolinium are desirable corrosion inhibitors for acidizing compositions. Because the metal (i.e. carbon steel) surface in acid solutions are etched of oxide films, the surfaces take on a cationic charge due to the presence of iron. While chloride anions in hydrochloric acid impart a bridging anionic charge between the corrosion inhibitor and the steel surface, intensifiers are typically applied to transition the surface to an anionic charge thereby making it suitable for adsorption of the quaternary surfactant. Examples of commonly used intensifiers include: iodide, iodate, bromide, formaldehyde, formic acid, antimony, stannous, bismuth and germanium. One preferred intensifier is glyoxal at about 200 to 2000 ppm glyoxal. Furthermore, combining glyoxal with iodide provides a synergistic effect.

Halide "Intensifiers" like bromide and iodide further increase the attraction of the quaternary corrosion inhibitor Cl<Br<I with iodide ions possessing higher atomic mass and lower electronegativity than bromide or chloride.

The addition of halides enhances the adsorption of the quaternary corrosion inhibitor. However, the halides function as a mediary between the metal (steel) surfaces and quaternary corrosion inhibitor. This relationship can be represented as Quat-Halide-Fe interactions with the halide being the mediary (bridging ion) that ties them together.

Furthermore, imperfections (interruptions) in coverage of the steel substrate resulting from the geometry of the quaternary hydrophobic structure expose the surface to the corrosive acid solution resulting in: corrosion, dissolution of iron ions and evolution of hydrogen gas. To combat the persistent deterioration and subsequent loss of integrity of the protective film, a residual (reservoir) of corrosion inhibitor is needed to reestablish the film.

In order to mitigate the inherent weaknesses and subsequent metal losses resulting from these limitations, a new novel corrosion inhibitor chemistry is required.

This novel invention improves corrosion inhibition of metal (steel) during acidizing of the wellbore increasing the life of the wireline and perforating gun, thereby allowing increased perforating cycles of said equipment.

The novel corrosion inhibitors are oxidative coupling product comprising at least one quaternized pyridinium-quinolinium complex, quaternized pyridinium-pyridinium complex and quaternized quinolinium-quinolinium complex. The resulting oxidative coupling product (OCP) demonstrates dramatic reductions in corrosion inhibition of steel in acid solution and elevated temperatures compared to comparable concentrations of the quaternized starting compounds (e.g. quaternary pyridinium, quaternary quinolinium) and their combinations.

Disclosed are novel compositions and methods for inhibiting corrosion of metal in a wellbore during acidizing a wellbore in a subterranean formation for fracking and extraction of oil and gas. The disclosed compositions exhibit unexpected and surprisingly superior corrosion inhibition of metal surfaces compared to the prior art corrosion inhibitor compositions and methods. Application of the disclosed invention provides surprising and unexpectedly significant economic and performance advantages over the prior art.

Objectives

In the first objective, the methods and compositions of the present invention mitigate the imperfections in the coverage of the metal substrate by bridging the gaps created by the geometry of the quaternary hydrophobic structure of the adsorbed corrosion inhibitor thereby forming a more uniform hydrophobic barrier film that impedes the aqueous phase from reaching the metal surface and inducing corrosion. This objective can be accomplished by: 1) establishing a uniform anionic charge across the surface of the metal substrate, and forming a more tenacious oxide surface across the metal substrate; and 2) forming a uniform hydrophobic barrier film that mitigates the gaps resulting from the geometry of the hydrophobic tail of the quaternary corrosion inhibitor.

Establishing a uniform anionic charge across the surface of the metal substrate is accomplished by applying intensifiers that adsorb onto the cationic charge iron (Fe) on the metal surface. Some intensifiers react with the iron in the steel resulting in the formation of an iron-oxide surface, while other intensifiers exemplified by iodide (iodate) and bromide form anionic charged bridges between the cationic iron on the metal surface and the quaternary corrosion inhibitor further mitigating gaps and increasing the surface area of the hydrophobic barrier film. Combining intensifiers that form iron-oxide complexes and anionic bridges provides a synergistic effect, thereby enhancing the hydrophobic coverage of the steel resulting from the adsorption of the quaternary corrosion inhibitors.

The OCPs disclosed impart a larger surface area of hydrophobic backbone compared to the building blocks of the OCPs. Without being bound by theory, it is believed the aromatic (and in some cases alkyl) structure of the OCPs mitigate the gaps between the geometry of the hydrophobic tails when using the quaternary building blocks of OCPs.

Embodiments

In the first embodiment is disclosed a method for inhibiting corrosion of metal in a wellbore during acidizing of the wellbore, the method comprising:
producing an aqueous acidizing composition comprising at least one acid, an effective amount of corrosion inhibiting oxidative coupling product and intensifier;
injecting the aqueous acidizing composition into the wellbore;
the metal in the wellbore adsorbs the intensifier resulting in establishing anionic sites along the metal surface;
chemically adsorbing the oxidative coupling product onto the anionic sites forming a hydrophobic barrier film;
the hydrophobic barrier film inhibits the acid from migrating to the at least one metal surface thereby inhibiting corrosion of the at least one metal surface, and
wherein the oxidative coupling product comprises two or more carbon-carbon bonded quaternary aromatic corrosion inhibitors resulting from the oxidative coupling reaction between at least one of quaternary pyridinium and quaternary quinolinium.

The method in accordance with the first embodiment, wherein at least some portion of the oxidative coupling product comprises two or more coupled quaternary aromatic corrosion inhibitors.

The method in accordance with the first embodiment wherein the intensifier comprises at least one of an iodide donor, a bromide donor, formaldehyde, formic acid, an antimony donor, a bismuth donor, a germanium donor, a stannous donor and glyoxal.

In the second embodiment is disclosed:
a ready-to-use corrosion inhibiting composition for treating an aqueous acid solution to inhibit corrosion of metal in a wellbore during acidizing the wellbore, the composition comprising:
at least one oxidative coupling product comprising from about 5 to 60 wt % of the composition;
at least one intensifier comprising from about 1 to 30 wt % of the composition;
at least one solvent comprising the difference to provide 100 wt % of the composition.

The composition in accordance with the second embodiment wherein the oxidative coupling product comprises quaternary pyridinium-pyridinium complex.

The composition in accordance with the second embodiment wherein the oxidative coupling product comprises quaternary pyridinium-quinolinium complex.

The composition in accordance with the second embodiment wherein the oxidative coupling product comprises quaternary quinolinium-quinolinium complex.

The composition in accordance with the second embodiment, further comprising at least one of quaternary pyridinium, quaternary quinolinium and quaternary imidazolium.

The composition in accordance with the second embodiment wherein the intensifier comprising at least one of: iodide donor, bromide donor; formaldehyde; formic acid; antimony, bismuth, germanium, and glyoxal.

In the third embodiment is disclosed:
a method of forming a hydrocarbon-bearing formation for a stimulation operation, the method comprising the steps:

step a) providing a wellbore having a casing;
step b) assessing at least a first location and a second location for perforation of the casing;
step c) inserting a bottom hole assembly into the wellbore; the bottom hole assembly comprising a plug and a perforation tool and the bottom hole assembly being connected to a wireline;
step d) injecting an acidic composition into the wellbore; wherein the acidic composition is in direct contact with the perforation tool, the wireline and the casing;
step e) positioning and setting the plug in the wellbore at a position downhole but proximate to the first location;
step f) positioning the perforation tool at the first location;
step g) perforating the casing at the first location with the perforation tool thereby creating a first perforated area and a first cementitious debris;
step h) allowing the acidic composition to come into contact with the first perforated area and the first cementitious debris for a predetermined period of time to prepare the formation for the stimulation operation;
step i) moving the perforation tool up-hole to the second location;
step j) perforating the casing at the second location with the perforation tool thereby creating a second perforated area and a second cementitious debris;
step k) allowing the acidic composition to come into contact with the second perforated area and the second cementitious debris for a predetermined period of time to prepare the formation for the stimulation operation;
step l) removing the perforation tool from the wellbore;
wherein the acid composition comprises an acid and a corrosion inhibitor package, the corrosion inhibitor package comprising:
an effective amount of corrosion inhibiting oxidative coupling product and intensifier;
the oxidative coupling product comprising at least one of a quaternary pyridinium-pyridinium complex, quaternary pyridinium-quinolinium complex and quaternary quinolinium-quinolinium complex, and
wherein the intensifier comprising an iodide donor.

The composition in accordance with the third embodiment, wherein the oxidative coupling product comprises 500 to 10,000 ppm of the acid composition.

The composition in accordance with the third embodiment, wherein the oxidative coupling product comprises 750 to 5,000 ppm of the acid composition.

The composition in accordance with the third embodiment, wherein the oxidative coupling product comprises 1000 to 2,500 ppm of the acid composition.

The composition in accordance with the third embodiment further comprising at least one of: an aldehyde, formic acid, antimony, bismuth, germanium and phosphate donor.

The composition in accordance with the third embodiment, wherein the intensifier concentration is between about 200 to 2000 ppm.

The composition in accordance with the third embodiment, wherein the intensifier further comprises formic acid.

The composition in accordance with the third embodiment, further comprising at least one of glyoxal and formaldehyde.

In the fourth embodiment is disclosed:
a method for producing a corrosion inhibiting oxidative coupling product, the method comprising:
combining and mixing in a vessel a solvent, at least one quaternary aromatic corrosion inhibitor selected from at least one of quaternary pyridinium and quaternary quinolinium, a nitrite donor and acid;

the nitrite donor in an amount to provide greater than or equal to 0.2 mole of nitrite per mole of quaternary aromatic corrosion inhibitor;

the acid in an amount sufficient to in-situ generate an effective amount of nitrous acid;

the nitrous acid initiates an oxidative coupling reaction producing the oxidative coupling product, and wherein the oxidative coupling product comprises two or more carbon-carbon bonded quaternary aromatic corrosion inhibitors.

DETAILED DESCRIPTION OF THE INVENTION

The following terms will be used throughout the specification and will have the following meanings unless otherwise indicated.

"A" or "an" means "at least one" or "one or more" unless otherwise indicated.

"Comprise", "have", "include" and "contain" (and their variants) are open-ended linking verbs and allow the addition of other elements when used in a claim. "Consisting of" is closed, and excludes all additional elements.

"Consisting essentially of" excludes additional material elements, but allows the inclusions of non-material elements that do not substantially change the nature of the invention.

When referring to a group, "at least one . . . and . . . " in the specification and claims is synonymous with "and/or". For example, "at least one of A, B and C" means A alone, B alone, C alone, or any combination of A, B or C.

"wt. %" is based on the total weight of the composition unless otherwise stated.

Definitions

Various compositions and methods of the invention are described below. Although particular compositions and methods are exemplified herein, it is understood that any of a number of alternative compositions and methods are applicable and suitable for use in practicing the invention.

As used herein, "ambient temperature" is used to describe the ability to carry out the oxidative coupling reaction without applying heat energy to elevate the temperature. Ambient temperature comprising typical room temperature (68-76° F.) allows the reaction to proceed. Reference to ambient temperature is not used to limit the range of temperature, it is only used to highlight the ability to carry out the oxidative coupling reaction without applying heat.

As used herein, "wellbore" describes the drilled channel (hole) within a subterranean formation that is lined with a metal casing (pipe).

Figure 1:
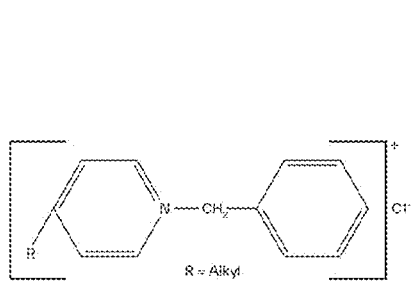
FIG. 1 illustrates non-limiting examples of suitable quaternary aromatic corrosion inhibitors suitable for producing oxidative coupling products disclosed in the invention.
Figure 1:
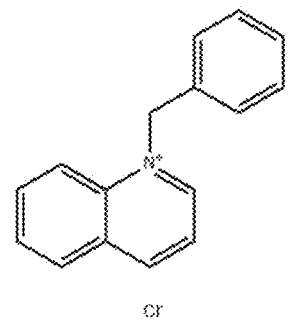
Figure 2:
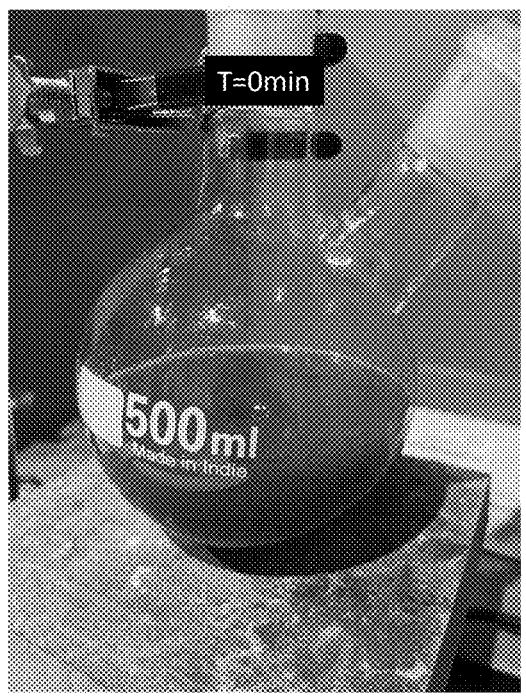
FIG. 2 illustrates the change in depth of color after acid addition showing the effect resulting from the in-situ generated nitrous acid activation of the oxidative coupling product reaction.
Figure 2:
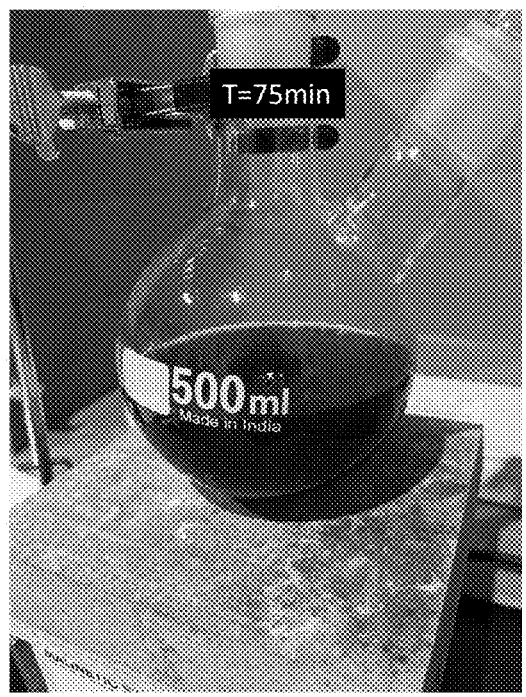

As used herein, "oxidative coupling product" also referred to as "OCP" and/or "OCPs" describes the product produced from an oxidative coupling reaction that results in a condensation product between two or more molecules of quaternary corrosion inhibitors selected from at least one of quaternary pyridinium and quaternary quinolinium and their various combinations (molar or wt % ratios). The said pyridinium and quinolinium may further comprise alkyl and/or aryl derivatives as illustrated in FIG. 1. The oxidative coupling product comprises at least one quaternary function group but preferably comprise two or more quaternary functional groups. Furthermore, when higher molar ratios of nitrite donor are applied during the production of OCPs, additional linking between the reactants occur resulting in an OCP comprising more than two bonded (linked) oxidative coupling reactants. For example, an OCP comprising a quaternary pyridinium-quinolinium complex may undergo additional oxidative coupling to produce a quaternary pyridinium-quinolinium-pyridinium complex. These higher molecular weight OCPs can form a tar like precipitate that is readily dissolved in an appropriate solvent system such as glycol ethers.

As used herein, "quaternary pyridinium-pyridinium" describes the general family of the OCP resulting from the oxidative coupling reaction. Use of the description quaternary pyridinium-pyridinium does not limit the molecular structure to two linked pyridinium molecules, neither does it limit the quaternary functionality to one quaternary group. In fact, the resulting OCP product may comprise multiple molecules having two or more carbon-carbon bonded (linkages) quaternary aromatic corrosion inhibitors thereby containing three or more pyridinium molecules and multiple quaternary functional groups.

As used herein, "quaternary pyridinium-quinolinium" describes the general family of the OCP resulting from the oxidative coupling reaction. Use of the description quaternary pyridinium-quinolinium does not limit the molecular structure to one quinolinium molecule linked to a pyridinium molecule. In fact, the resulting OCP product may comprise multiple molecules having two or more carbon-carbon bonded (linkages) quaternary aromatic corrosion inhibitors thereby containing three or more pyridinium and/or quinolinium molecules and multiple quaternary functional groups.

As used herein, "quaternary quinolinium-quinolinium" describes the general family of the OCP resulting from the oxidative coupling reaction. Use of the description quaternary quinolinium-quinolinium does not limit the molecular structure to two linked quinolinium molecules. In fact, the resulting OCP product may comprise multiple molecules having two or more carbon-carbon bonded (linkages) quaternary aromatic corrosion inhibitors thereby containing three or more pyridinium molecules and multiple quaternary functional groups.

As used herein, "oxidative coupling reaction" describes the mechanism that chemically bonds (couples) two or more molecules of quaternary aromatic corrosion inhibitors selected from at least one of quaternary quinolinium and quaternary pyridinium resulting in the production of a corrosion inhibiting oxidative coupling product. Without being bound by theory, the oxidative coupling product is believed to be the condensation product of the quaternary corrosion inhibitors resulting from oxidative coupling initiated by the decomposition products of nitrous acid exemplified by free radical nitric oxide (NO.), nitrosonium ($NO^+$) and the like.

As used herein, "nitrous acid initiates an oxidative coupling reaction" describes the use of in-situ generated nitrous acid to initiate the oxidative coupling reaction. Without being bound by theory, it is believed at least one of nitrous acid and/or the decomposition products of nitrous acid exemplified by nitric oxide (NO.), nitrosonium ($NO^+$) initiate the coupling reaction resulting in a condensation product comprising a higher molecular weight quaternary oxidative coupling product.

As used herein "based on active OCP" refers to the amount of oxidative coupling product in the formulation used as a corrosion inhibitor. For example, if the formulated product comprises 20 wt % OCPs, to achieve 1000 ppm based on active OCP, the amount of the formulated product added to the acidizing solution would be 5000 ppm formulated product.

As used herein "acid composition" and "acidizing composition" can be used interchangeably.

As used herein, "metal" is used to describe carbon steel, carbon steel alloys and stainless steel that comes in contact with the aqueous acidizing composition during the acidizing of the wellbore in fracking operation. Examples of such metallic surfaces include the steel casing lining the wellbore, the wireline and the perforating gun.

As used herein, "gpt" means gallons per thousand, and specifically pertains to the dosage of corrosion inhibiting composition (gallons) added per 1000 gallons of aqueous acidizing composition.

As used herein, "iodide donor" describes at least one of iodide. Non-limiting examples of iodide donors include: sodium iodide, potassium iodide, ammonium iodide, cupper iodide and the like.

As used herein, "bromide donor" describes at source of bromide exemplified by the non-limiting examples: sodium bromide, potassium bromide, lithium bromide, ammonium bromide and the like.

As used herein, "phosphate donor" describes a source of phosphate exemplified by the non-limiting examples: diammonium hydrogen phosphate, disodium phosphate, monosodium phosphate and phosphoric acid.

As used herein, "effective amount" describes the concentration of a chemical to achieve the target effect. Non-limiting examples include: an effective amount of nitrous acid is the concentration required to produce the target amount of oxidative coupling product; an effective amount of oxidative coupling product is the concentration required to provide a corrosion rate of steel below that achieved by using a higher concentration of quaternary precursors used to produce the (OCP). To further clarify, assume a 1:1 wt % blend of quaternary pyridinium and quaternary quinolinium applied at 2 wt % based on the acidizing solution provides a metal loss of 0.05 $lbm/ft^2$ at 200° F. with 6 hr exposure. An effective amount of OCP will be a concentration of <2 wt % while achieving ≤0.05 $lbm/ft^2$ at 200° F. with 6 hr exposure.

Acids

Examples of the acid concentration in the aqueous acidizing composition range between about 5 to 28 wt %, more preferably about 7.5 to 20 wt % and most preferably about 10 to 15 wt %. Suitable acid can be selected from mineral acids, organic acids and/or any combination thereof. Non-limiting examples of mineral acids include hydrochloric acid, sulfuric acid, hydrofluoric acid and the like. Non-limiting examples of organic acids include formic acid, acetic acid, citric acid and the like.

Acids may further comprise synthetic acids stabilized using retarding agents.

Retarding agents are organic nitrogen bearing compounds that form adducts with the acid to slow the release of the hydrogen and retard the aggressive corrosive nature of the acid. For example, urea combined with hydrochloric acid forms urea hydrochloride which dramatically retards the reactivity of the acid solution and suppresses the toxic vapors. Numerous retarding agents have been disclosed in the prior art including amino acids (e.g. glycine, lysine etc.), amino alcohols (e.g. monoethanolamine, diethanolamine etc.) and amines such as morpholine and dieethylhydroxlamine. These are non-limiting examples and the limited examples is not intended to limit the viable retarding agents available. Prior art can be referenced for a more comprehensive list of available retarding agents.

Synthesis of Oxidative Coupling Product

The methods of synthesis being disclosed are not meant to limit the invention in any way. They are non-limiting examples to illustrate a pathway toward the viable production and commercialization of the OCPs.

OCPs originate from the reaction of either pyridinium and/or quinolinium with benzyl chloride. The resulting quaternary pyridinium and quaternary quinolinium are then reacted using oxidative coupling reaction to produce the oxidative coupling product. Other heterocyclic precursors exemplified by imidazoline may be suitable as well.

A novel method is disclosed that utilizes acid ($H^+$ donor) activated nitrite to form nitrous acid. Nitrous acid is a weak acid having a reported pKa value of about 3.3. As a weak acid there is an equilibrium established between the protonated nitrous acid and the unprotonated nitrite where a 1:1 ratio of protonated to unprotonated occurs at about a pH of 3.3. The acid used to activate the nitrite to nitrous acid can be a mineral acid or organic acids. Non-limiting examples of acids include: hydrochloric acid, sulfuric acid, phosphoric acid, methanesulfonic acid and formic acid.

When the pH of the solution is lowered to <6, the oxidative coupling reaction is observed over time but at a relatively slow rate. As more acid is added and the pH is further lowered, nitrous acid concentrations increase and the rate of the oxidative coupling reaction increases. When the pH is reduced to below the pKa of $HNO_2$ (~3.3) value, the rate of oxidative coupling is accelerated dramatically. As illustrated in the synthesis examples, when the pH was lowered to below the pKa value the rate of change in color and depth of color (darkness) of the reacting solution was almost instantaneous. The transition from a brown solution to a red-black solution occurred over a period of seconds. Therefore, the speed of the synthesis can be controlled by adjusting the addition of acid to increase the conversion of nitrite to nitrous acid and its various decomposition products that drive the oxidative coupling reaction. Furthermore, implementing process control to automatically feed the acid to target a pH would be a viable means of minimizing production time and may allow for a continuous production process as opposed to a batch process.

Figure 3:
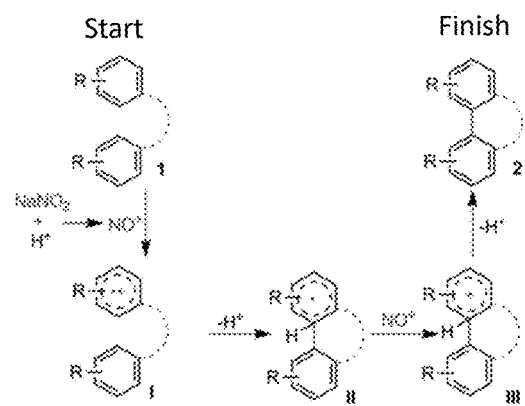
FIG. 3 illustrates the theoretical reaction mechanism for the oxidative coupling reaction. The aromatic groups like those inherent to the quaternary aromatic corrosion inhibitors disclosed couple through a single carbon-carbon (C—C) bond.
Figure 4:
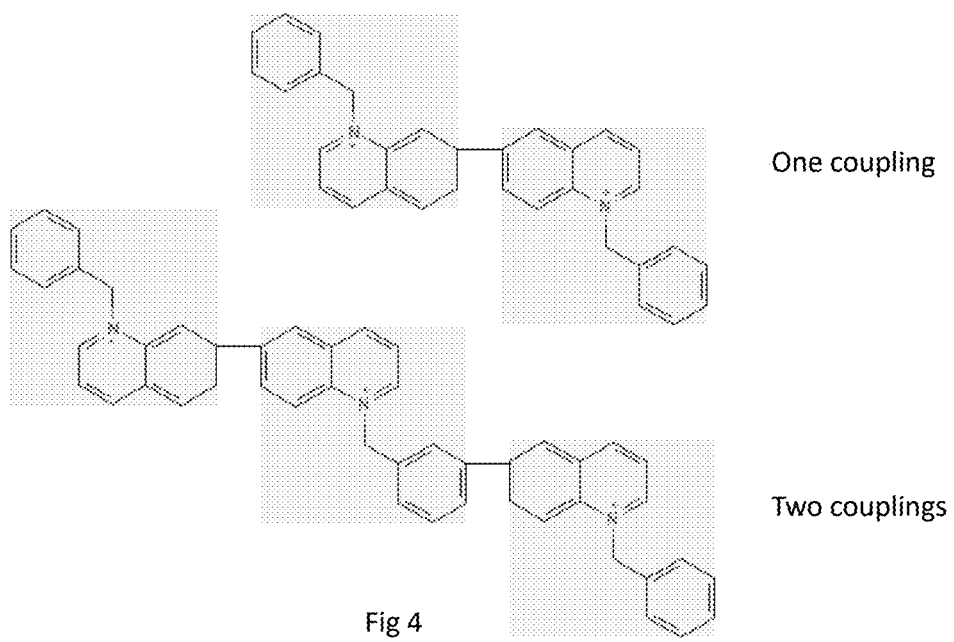
FIG. 4. illustrates the theoretical general structure of an oxidative coupling product produced by reacting a quaternary quinolinium compound using the oxidative coupling reaction initiated using nitrous acid. The example shows more than two quaternary aromatic corrosion inhibitor molecules can be linked resulting in a higher molecular weight OCP.
Figure 5:
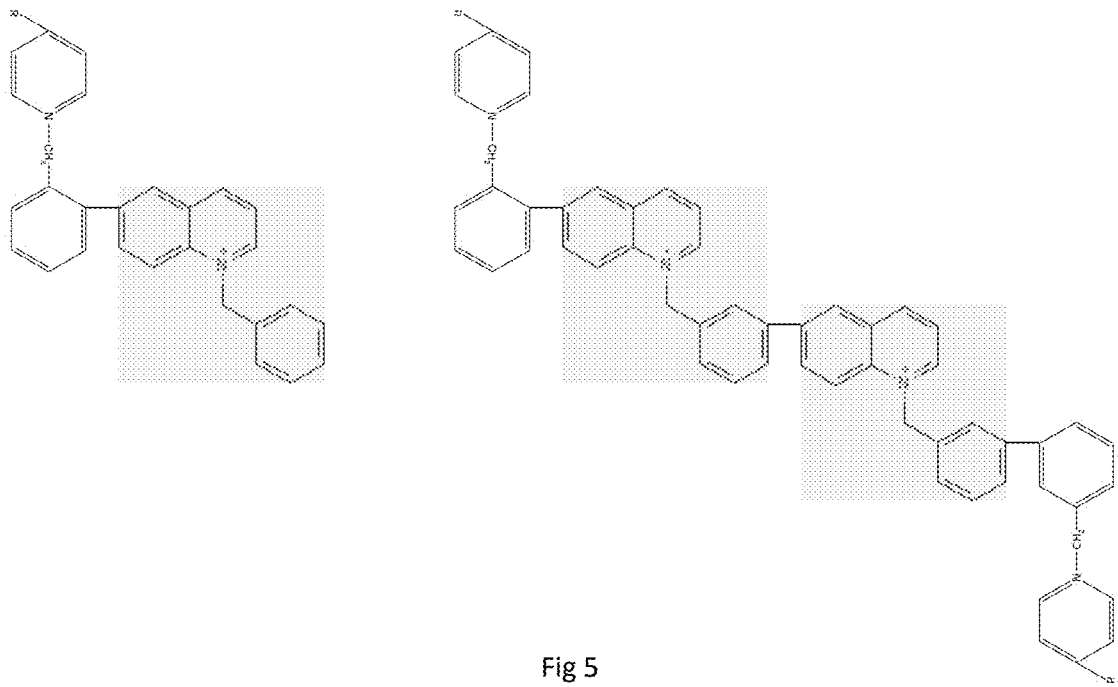
FIG. 5 illustrates the theoretical general structure of an oxidative coupling product produced by reacting a quaternary quinolinium along with quaternary pyridinium using the oxidative coupling reaction initiated using nitrous acid. The example shows more than two quaternary aromatic corrosion inhibitor molecules can be linked resulting in a higher molecular weight OCP.

The amount of nitrite donor is preferably greater than or equal to 0.2 mole, more preferred greater than or equal to 0.5 mole and most preferred greater than or equal to 1 mole nitrite donor per mole of quaternary corrosion inhibitor (QCI). The oxidative coupling reaction only requires one of the two QCI molecules to be oxidized to initiate the linkage between the two QCI molecules as illustrated in FIG. 3. Theoretically, oxidizing 50% of the QCI molecules is sufficient to produce 100% of the targeted oxidative coupling product. However, the ability to control which molecules are oxidized and which one are not is not obtainable. Excess oxidation can induce coupling of multiple QCI molecules leading to the formation of a tar like precipitate. Additional solvent and/or selection of more suitable solvent such as glycol ether readily dissolves the higher molecular weight OCP as illustrated in the examples. A nitrite donor molar ratio of about 0.2 to 4 per mole of QCI is a suitable range for synthesis of the OCP using the method disclosed, but this proposed range is not meant to be a limiting factor.

The quaternary pyridinium and quaternary quinolinium can be produced independently then mixed and matched as desired, or can be produced together in a single pot by combining pyridinium and quinolinium in the desired ratios, then reacting with benzyl halide (e.g. chloride or bromide).

Another option is to purchase at least one of a commercially available quaternary pyridinium and/or quaternary quinolinium, then mix and match as desired to produce the OCP.

For illustration, if quaternary pyridinium is purchased, it can be added to the solvent (i.e. glycol ether-water) followed by addition of the nitrite donor ($NaNO_2$, $KNO_2$ etc.) and reacted thereby simplifying the production process.

The ratio of quaternary pyridinium and quaternary quinolinium can be varied to achieve the desired blend of OCPs. For example, a 1:1 molar ratio of quaternary pyridinium to quaternary quinolinium would be expected to result in blend of quaternary pyridinium-quinolinium, quaternary pyridinium-pyridinium and quaternary quinolinium-quinolinium complexes. Altering the molar ratio to 0.5:1 would result in a different mixture of OCPs. However the actual OCP resulting from the mixture will also depend on the number of carbon-carbon linkages that occur which can be controlled to some extent by the molar ratio of nitrite donor.

Figure 6:
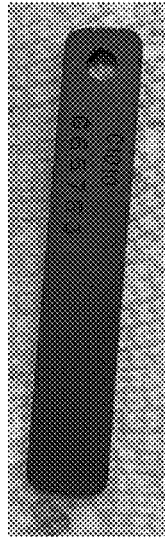
FIG. 6 illustrates a 1010 carbon steel coupon after exposure to SYN #9 and Alpha 1038 at about 94-95° C. for 4 hours. After thoroughly immersing and swirling in water, followed by immersing and swirling in acetone, the SYN #9 coupon retained a uniform adherent tan/brown film, while the Alpha 1038 treated coupon acquired a grey metallic appearance. The SYN #9 observation was extremely uncharacteristic compared to the other coupons treated with Alpha 1038, Uniquat 10-80 and their blends. Adsorbed films using commercially available treatments often appear to have blotches of oily residue that readily dissolves in acetone. In the SYN #9 example, the hydrophobic film appeared extremely uniform on both sides of the coupon and was extremely persistent even after exposure to the acetone.
Figure 6:
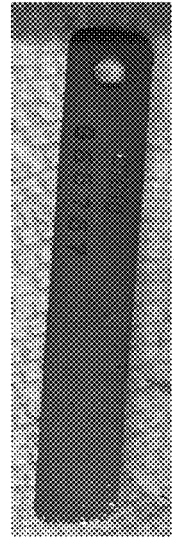

One preferred OCP comprises a mixture of oxidative coupling products resulting from the combining quaternary aromatic corrosion inhibitors selected from at least one of quaternary pyridinium and quaternary quinolinium. Combining quaternary pyridinium and quaternary quinolinium with a solvent results in a mixture to produce the oxidative coupling products resulting in a mixture of oxidative coupling products comprising: quaternary pyridinium-pyridinium, quaternary pyridinium-quinolinium and quaternary quinolinium-quinolinium. Without being bound by theory, a mixture of oxidative coupling products synergistically works by allowing different geometric structures to mix and match to inhibit voids and enhance the coverage of the metal by the hydrophobic film resulting from the adsorbed OCPs, much like the pieces of a puzzle having different shapes and sizes fill the voids of the puzzle. The resulting hydrophobic film (FIG. 6) is very uniform and resistant to even solvents such as acetone that otherwise will readily dissolve the protective film resulting from the quaternary corrosion inhibitors (QCI) used to produce the oxidative coupling product. Addition of residual quaternary pyridinium and quaternary quinolinium may further enhance the performance of the oxidative coupling products by providing lower molecular weight quaternary corrosion inhibitors to enhance the hydrophobic coverage.

Solvents for producing and formulating compositions comprising CAPs may include non-limiting examples: alcohols, water, acetone, ethylene glycol monobutyl ether, glycols, glycol ethers, DMSO and the like. Preferred solvents comprise mixtures exemplified by glycol ether, alcohol and water.

The nitrite donor can comprise any source of nitrite exemplified by the non-limiting examples sodium nitrite, potassium nitrite, lithium nitrite and the like. The amount of nitrite to produce the oxidative coupling product is greater than or equal to 0.2 mole per mole of quaternary pyridinium and/or quaternary quinolinium reactants use to produce the OCPs. Preferably the amount of nitrite donor is greater than or equal to 0.5 mole and more preferred greater than or equal to 1 mole per mole of quaternary corrosion inhibitor.

Acid addition is used to in-situ generate nitrous acid from the nitrite donor. Preferably only enough acid is added to acidify the OCP producing solution to provide and sustain an effective amount of nitrous acid to drive the oxidative coupling reaction in a controlled manner. Therefore, controlling the amount of nitrite donor and acidity (i.e. pH) are useful in optimizing the production of the targeted OCP. Without being bound by theory, higher molar ratios of nitrite donor may result in higher molecular weight OCPs by linking two or more quaternary aromatic corrosion inhibitors together. It is believed the resulting OCPs maintain their charge density by retaining the quaternary functionality on the original quaternary aromatic corrosion inhibitor. As disclosed, additional acid that causes the pH to approach or go below the pKa of nitrous acid accelerates the rate of the oxidative coupling reaction.

Methods

The description that follows, and the embodiments described therein, is provided by way of illustration of an example, or examples, of particular embodiments of the principles of the present invention. These examples are provided for the purposes of explanation, and not limitation, of those principles and of the invention.

In a conventional plug and perforate operations, the isolation plug is set in the well, the casing is perforated by a tool (guns), then the tool is pulled out of the hole and then acid is pumped and circulated to the perforations (this process can take hours in some extreme cases) and once a feed rate is reached, they begin the stimulation for that stage of the well. The process is then repeated (over 40 to 100 or more stages in many cases).

According to a preferred embodiment of the present invention, the method allows for an operator to pump the tools down with the spearhead acid to perforate the zone and let the acid sit over the perforations or perforate in the acid. This is followed by the removal of the tool from the wellbore and initiating of the stimulation immediately following the perforating tools removal, thereby greatly increasing the efficiency of the operation by removing an entire step from the common process.

According to a preferred embodiment of the present invention, this method can save up to an one (1) hour per stage at an average cost of $20,000/hr (for the stimulation crew and equipment) and 30-50 m$^3$ (8000-13,250 gallons) of water per stage depending on depth, casing size and final method. In an average 50-stage well, this can translate into savings of up to or over $1,000,000 in time plus the saved water of up to or over 800,000 gallons. The potential savings from the implementation of this method in operations in the North America alone could reach upwards of several hundreds of millions of dollars per year for the industry and billions of gallons of water saved.

Hydrochloric acid (HCl) is the most commonly used acid in stimulation or for spearhead acid. With this in mind, one must understand that perforation tools and the deployment wireline systems are mostly comprised of stainless metal to ensure longevity and offer the highest level or performance. Conventional plug and perforation processes require theremoval of the perforation guns immediately after the perforation stage otherwise the spearhead acid could compromise the perforating guns and deployment wireline systems because of their propensity to attack stainless-metal and stainless-metal alloys. A critical factor in allowing a process to have stainless metal predominate components exposed to strong acids such as HCl is the ability to control or minimize corrosion to a level below which would normally render a stainless-metal tool and wireline deployment system unusable after only a few cycles (or even less in some cases). With the development of a novel corrosion inhibitor which affords substantial long-term acidic exposure protection of stainless metal or such acid sensitive alloys from damage from exposure to hydrochloric acid (HCl), there is a neverseen-before industrial or industry-widescale possibility of removing a time and water consuming step of the prestimulation process, thereby saving substantial time, money and water resources. The advantages are compounded when using optimal acidic compositions (i.e. effectiveness and corrosion inhibition) as more wells and more perforation operations can be carried out. The savings are compounded by the number of operations which are carried out without replacing the bottom hole assembly and/or the wireline/slickline or coiled tubing or applicable conveyance method. For this reason, a new generation of corrosion inhibitor for use during acidizing a wellbore is needed.

The compositions and methods disclosed provide superior corrosion inhibition and well as significantly improved economics when compared to the corrosion inhibitors disclosed in the prior art.

SYNTHESIS EXAMPLES

Example 1

Quaternary Pyridinium-Pyridinium Complex Using In-Situ Generated Nitrous Acid.

A 500 ml round bottom reactor with magnetic stirring rod was secured on top of a magnetic stirrer. The following was added to the reactor while stirring:
   100 ml Denatured Alcohol
   100 ml R.O. Water
   18.0 g KNO$_2$
   20 ml Uniquat 10-80 (supplied by Arxada)

Once thoroughly mixed, 21.5 ml (~24.7 g) 31.25% HCl was slowly added while mixing. The temperature was continuously monitored and recorded shortly after the last of the acid was added (25° C.). It was noted that after approximately 10 ml of acid was added, the sample began boiling (gas generation) and the sample began darkening. With continued acid addition, the sample darkened more rapidly as was essentially black in color shortly after the last addition of acid.

Example 2

Quaternary Pyridinium-Pyridinium Complex Using In-Situ Generated Nitrous Acid.

A 500 ml round bottom reactor with magnetic stirring rod was secured on top of a magnetic stirrer. The following was added to the reactor while stirring:
   100 ml Denatured Alcohol
   100 ml R.O. Water
   18.5 g KNO$_2$
   20 ml Uniquat 10-80 (supplied by Arxada)

Once thoroughly mixed, 5 ml of 31.25% HCl was slowly added while mixing. The temperature and pH was recorded after acid addition (25° C. and pH 5.48). Photographs were taken before and after acid addition FIGS. 2-5. The solution before acid addition maintained a tan-brown color. After acid addition and 6 minutes of lapsed time, images illustrate the transition to a red-black color which continued to darken for about 75 min. After about 75 min the sample appeared black with no visible change in color after this period of lapsed time. Sample labeled SYN #2.

Example 3

Quaternary Pyridinium-Pyridinium Complex.

A 500 ml round bottom reactor with magnetic stirring rod was secured on top of a magnetic stirrer. The following was added to the reactor while stirring:
   100 ml Denatured Alcohol
   100 ml R.O. Water
   18.2 g KNO$_2$
   20 ml Uniquat 10-80 (supplied by Arxada)

Once thoroughly mixed, increments of 31.25% HCl was slowly added while mixing and monitoring the pH.
   5 ml of 31.25% HCl, pH 5.48
   5 ml of 31.25% HCl, pH 5.15
   5 ml of 31.25% HCl, pH 4.96-Bubbling detected indicating probable NO gas from decomposition of nitrous acid.
   5 ml of 31.25% HCl, pH 4.11
   2 ml of 31.25% HCl, pH 1.80

After the final addition of acid, the sample rapidly turn dark.

Total concentration of HCl added was about equivalent to a 1:1 molar ratio to the KNO$_2$ added. Sample labeled as SYN #3.

Example 4

Quaternary Quinolinium-Quinolinium Complex.

A 500 ml round bottom reactor with magnetic stirring rod was secured on top of a magnetic stirrer. The following was added to the reactor while stirring:
   100 ml Denatured Alcohol
   100 ml R.O. Water
   18.4 g KNO$_2$
   25 ml Alpha 1038 (supplied by Lubrizol)

Once thoroughly mixed, increments of 31.25% HCl was slowly added while mixing and monitoring the pH.
No acid, pH 5.65
5 ml of 31.25% HCl, pH 5.25
5 ml of 31.25% HCl, pH 5.06
5 ml of 31.25% HCl, pH 4.86-Bubbling detected indicating probable nitric oxide (NO) gas from decomposition of nitrous acid.
5 ml of 31.25% HCl, pH 3.92
1 ml of 31.25% HCl, pH 2.20-temperature recorded at 30° C.

At completion of the acid addition, the sample was near black in appearance. The sample was allowed to mix for about 30 minutes, then filtered to remove solids. Sample labeled as SYN #4.

Example 5

Quaternary Quinolinium-Pyridinium Complex.
A 500 ml round bottom reactor with magnetic stirring rod was secured on top of a magnetic stirrer. The following was added to the reactor while stirring:
100 ml Denatured Alcohol
100 ml R.O. Water
18.15 g $KNO_2$
10 ml Uniquat 10-80 (supplied by Arxada)
12.5 ml Alpha 1038 (supplied by Lubrizol)

Once thoroughly mixed, increments of 31.25% HCl was slowly added while mixing and monitoring the pH.
No acid, pH 5.70
15 ml of 31.25% HCl, pH 4.80 Gas liberation (boiling effect throughout sample). Rapid darkening in color.
5 ml of 31.25% HCl, pH 4.30
1 ml of 31.25% HCl, pH 2.90

At completion of the acid addition, the sample was near black in appearance. The sample was allowed to mix for about 30 minutes, then filtered to remove solids. Sample labeled as SYN #5.

Example 6

Quaternary Quinolinium-Quinolinium Complex.
A 100 ml round bottom reactor with magnetic stirring rod was secured on top of a magnetic stirrer. The following was added to the reactor while stirring:
20 ml Denatured Alcohol
100µ 1 HCl (31.25%)
10 ml Alpha 1038 (supplied by Lubrizol)

A nitrite donor solution was prepared by dissolving 1.15 g potassium nitrite in 8.85 ml R.O. water. While mixing the reactor solution, the nitrite donor solution was slowly added into the vortex using a slow drip over about 5 minutes. After about 10 minutes of mixing, the pH of the reacting solution was measured and recorded 4.75. The solution was allowed to mix for another 3 hours. After several hours of resting, a very small amount of sediment was observed in the bottom of the reactor. The sample was labeled SYN #6.

Example 7

Quaternary Quinolinium-Quinolinium Complex.
A 100 ml round bottom reactor with magnetic stirring rod was secured on top of a magnetic stirrer. The following was added to the reactor while stirring:
20 ml ethylene glycol monobutylether
100 µl HCl (31.25%)
10 ml Alpha 1038 (supplied by Lubrizol)

A nitrite donor solution was prepared by dissolving 1.15 g potassium nitrite in 8.85 ml R.O. water. While mixing the reactor solution, the nitrite donor solution was slowly added into the vortex using a slow drip over about 5 minutes. The solution was allowed to mix for another 1 hour. No precipitate was observed in the bottom of the reactor. The sample was labeled SYN #7.

Example 8

Quaternary Pyridinium-Quinolinium Complex.
A 100 ml round bottom reactor with magnetic stirring rod was secured on top of a magnetic stirrer. The following was added to the reactor while stirring:
20 ml ethylene glycol monobutylether
100 µl HCl (31.25%)
5 ml Alpha 1038 (supplied by Lubrizol)
5 ml Uniquat 10-80 (supplied by Arxada)

A nitrite donor solution was prepared by dissolving 1.15 g potassium nitrite in 8.85 ml R.O. water. While mixing the reactor solution, the nitrite donor solution was slowly added into the vortex using a slow drip over about 5 minutes. The solution was allowed to mix for another 1 hour. No precipitate was observed in the bottom of the reactor. The sample was labeled SYN #8.

Example 9

Quaternary Quinolinium-Quinolinium Complex.
A 100 ml round bottom reactor with magnetic stirring rod was secured on top of a magnetic stirrer. The following was added to the reactor while stirring:
20 ml ethylene glycol monobutyl ether
10 ml Alpha 1038 (supplied by Lubrizol)

A nitrite donor solution was prepared by dissolving 6.88 g potassium nitrite in 6 ml R.O. water. The nitrite donor solution was added into the vortex. 8.1 ml of HCl (31.25% Active) was slowly added while mixing. The pH after the acid addition was 3.92. The solution was allowed to mix for about 2 hours. The dark red-black solution was decanted leaving behind precipitated solids. The solids where triple rinsed with acetone revealing crystalline salts that readily dissolved in water. The sample was labeled SYN #9.

Example 10

Quaternary Pyridinium-Quinolinium Complex.
A 100 ml round bottom reactor with magnetic stirring rod was secured on top of a magnetic stirrer. The following was added to the reactor while stirring:
20 ml ethylene glycol monobutyl ether.
6.77 g potassium nitrite was added followed by 6 ml R.O. water and mixed until dissolved.
5 ml Alpha 1038 (supplied by Lubrizol)
5 ml Uniquat 10-80 (supplied by Arxada)

While monitoring pH 31.25% HCl was added in 1 ml increments until the pH was <4.0 which required about 9 ml acid. The solution was allowed to mix for about 1 hour. The dark red-black solution was decanted leaving behind precipitated solids. The solids where triple rinsed with acetone revealing crystalline salts that readily dissolved in water. The sample was labeled SYN #10.

Coupon Testing

Coupons for screening purposes were comprised of 1010 carbon steel. Coupons comprising 1010 carbon steel are far more susceptible to acid corrosion compared to alloys like N80.

Acidizing samples were prepared using 15 wt % HCl and treated with the appropriate corrosion inhibitors and intensifiers as disclosed resulting in beakers containing approximately 190 ml of acidizing solution. The samples were placed in a water bath, the water coated with a layer of silicone oil to retain heat. A thermometer in a sealed water filled jar was used to monitor the liquid temperature in the samples. A digital heater was set at 300° C. to begin heating the samples. Once the sample temperatures reached 90° C., the heater was reduced to 200° C. which sustained 94-95° C. consistently throughout the duration of the test. The test duration of 4 hours began when the sample temperature exceeded 90° C.

TABLE 1

| SYN #9 (1980 ppm as active Alpha 1038) | 2.4 ml | 2.4 ml |
| --- | --- | --- |
| KI | 0.65 ml KI Soln | 0.65 ml KI Soln |
| Formaldehyde | 0.55 ml (37%) | NA |
| Glyoxal | NA | 0.55 ml (40%) |
| Starting Wt | 12.31 g | 12.28 g |
| Final Wt | 12.17 g | 12.00 g |
| % loss | 1.14% | 2.28% |
| Blend Alpha 1038 + Uniquat 10-80 (10 gpt) | 0.95 ml + 0.95 ml | 0.95 ml + 0.95 ml |
| KI | 0.65 ml KI Soln | 0.65 ml KI Soln |
| Formaldehyde | 0.55 ml (37%) | NA |
| Glyoxal | NA | 0.55 ml (40%) |
| Starting Wt | 12.16 g | 12.32 g |
| Final Wt | 12.09 g | 12.18 g |
| % loss | 0.58% | 1.15% |
| Alpha 1038 (10 gpt) | 1.9 ml | 1.9 ml |
| KI | 0.65 ml KI Soln | 0.65 ml KI Soln |
| Formaldehyde | 0.55 ml (37%) | NA |
| Glyoxal | NA | 0.55 ml (40%) |
| Starting Wt | 12.34 | 12.25 |
| Final Wt | 12.23 | 12.07 |
| % loss | 0.89% | 1.47% |

SYN #9 at 1980 ppm as active Alpha 1038 performed surprisingly well with only 20% of the quaternary aromatic corrosion inhibitor compared to the blend of Alpha 1038+ Uniquat 10-80 and the stand alone Alpha 1038 that was used to produce the OCP of SYN #9.

In the next series of test, equivalent comparative samples were prepared comprising the Blend of Alpha 1038 and Uniquat 10-80 and Alpha 1038 alone. However, the SYN #9 dosage was increased to 3960 ppm based on the calculated active Alpha 1038.

TABLE 2

| SYN #9 (3960 ppm as active Alpha 1038) | 4.8 ml | 4.8 ml |
| --- | --- | --- |
| KI | 0.65 ml KI Soln | 0.65 ml KI Soln |
| Formaldehyde | 0.55 ml (37%) | 0.55 ml (40%) |
| Starting Wt | 12.19 g | 12.34 g |
| Final Wt | 12.16 g | 12.32 g |
| % loss | 0.25% | 0.16% |
| Blend Alpha 1038 + Uniquat 10-80 (10 gpt) | | 0.95 ml + 0.95 ml |
| KI | | 0.65 ml KI Soln |
| Formaldehyde | | 0.55 ml (37%) |
| Starting Wt | | 12.33 g |

TABLE 2-continued

| Final Wt | 12.25 g |
| --- | --- |
| % loss | 0.65% |
| Alpha 1038 (10 gpt) | 1.9 ml |
| KI | 0.65 ml KI Soln |
| Formaldehyde | 0.55 ml (37%) |
| Starting Wt | 12.28 g |
| Final Wt | 12.17 g |
| % loss | 0.90% |

The metal loss results illustrate exceptional corrosion inhibition provided by the SYN #9 sample comprising quaternary quinolinium-quinolinium complex using only 40% of the actives compared to the commercially available quaternary aromatic corrosion inhibitors.

The testing methods were repeated using formic acid and potassium iodide intensifiers with SYN #9 and SYN #10 comprising quaternary pyridinium-quinolinium OCP.

TABLE 3

| SYN #9 | 2.4 ml | 2 ml |
| --- | --- | --- |
| KI | 0.65 ml KI Soln | 0.65 ml KI Soln |
| Formic Acid | 0.4 ml (90%) | 0.4 ml (90%) |
| Start Weight | 12.28 | 12.35 |
| Final Weight | 12.17 | 12.33 |
| wt % loss | 0.89% | 0.16% |
| SYN #10 | 2.4 ml | 2 ml |
| KI | 0.65 ml KI Soln | 0.65 ml KI Soln |
| Formic Acid | 0.4 ml (90%) | 0.4 ml (90%) |
| Start Weight | 12.23 | 12.32 |
| Final Weight | 12.14 | 12.3 |
| wt % loss | 0.74% | 0.16% |

The data clearly illustrates the oxidative coupling product resulting from nitrous acid initiated oxidative coupling reaction provides superior corrosion inhibition when compared to the quaternary aromatic corrosion inhibitors used to produce the OCP.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

The invention claimed is:

1. A method for inhibiting corrosion of metal in a wellbore during acidizing of the wellbore, the method comprising:
   producing an aqueous acidizing composition comprising at least one acid, an effective amount of corrosion inhibiting oxidative coupling product and an intensifier;
   injecting the aqueous acidizing composition into the wellbore;
   the metal in the wellbore adsorbs the intensifier resulting in establishing anionic sites along the metal surface;

chemically adsorbing the oxidative coupling product onto the anionic sites forming a hydrophobic barrier film;
the hydrophobic barrier film inhibits the acid from migrating to the metal surface thereby inhibiting corrosion of the metal surface;
the oxidative coupling product comprises three or more bonded quaternary aromatic corrosion inhibitors resulting from an oxidative coupling reaction between at least one of a quaternary pyridinium and quaternary quinolinium; and
wherein a bond between each of the three or more bonded quaternary aromatic corrosion inhibitors is a single carbon-carbon bond.

2. The method in accordance with claim 1, wherein the intensifier comprises at least one of an iodide donor and a bromide donor.

3. The method in accordance with claim 2, wherein the intensifier is in a concentration from about 100 ppm to 2000 ppm.

4. The method in accordance with claim 1, wherein the intensifier comprises an iodide donor and formaldehyde.

5. The method in accordance with claim 4, wherein the iodide concentration is about 100 ppm to 1,000 ppm and the concentration of formaldehyde is about 500 to 2000 ppm.

6. The method in accordance with claim 1, wherein the intensifier comprises an iodide donor and formic acid.

7. The method in accordance with claim 6, wherein the iodide concentration is about 100 ppm to 1,000 ppm and the concentration of formic acid is about 500 to 5000 ppm.

8. The method in accordance with claim 1, wherein the intensifier comprises at least one of an antimony donor, a bismuth donor, a germanium donor and a stannous donor.

9. The method in accordance with claim 1, wherein the intensifier comprises glyoxal.

10. The method in accordance with claim 9, wherein the intensifier is in a concentration ranging from about 200 to 2,000 ppm.

11. The method in accordance with claim 1, wherein the oxidative coupling product is in a concentration from about 500 to 10,000 ppm based on active oxidative coupling product.

12. The method in accordance with claim 1, wherein the oxidative coupling product is in a concentration from about 750 to 5,000 ppm based on active oxidative coupling product.

13. The method in accordance with claim 1, wherein the oxidative coupling product is in a concentration from about 1000 to 2,500 ppm based on active oxidative coupling product.

14. A method for inhibiting corrosion of metal in a wellbore during acidizing of the wellbore, the method comprising:
producing an aqueous acidizing composition comprising at least one acid, an effective amount of corrosion inhibiting oxidative coupling product and an intensifier;
injecting the aqueous acidizing composition into the wellbore;
the metal in the wellbore adsorbs the intensifier resulting in establishing anionic sites along the metal surface;
chemically adsorbing the oxidative coupling product onto the anionic sites forming a hydrophobic barrier film;
the hydrophobic barrier film inhibits the acid from migrating to the metal surface thereby inhibiting corrosion of the metal surface;
wherein the oxidative coupling product comprises two or more carbon-carbon bonded quaternary aromatic corrosion inhibitors resulting from an oxidative coupling reaction between at least one of a quaternary pyridinium and quaternary quinolinium; and
wherein the oxidative coupling product is the result of:
combining and mixing in a vessel a solvent, at least one quaternary aromatic corrosion inhibitor selected from at least one of quaternary pyridinium and quaternary quinolinium, a nitrite donor and an acid;
the solvent comprises at least one of a glycol ether, alcohol and water;
the nitrite donor in an amount to provide greater than or equal to 0.2 mole of nitrite per mole of the at least one quaternary aromatic corrosion inhibitor;
the acid in an amount sufficient to in-situ generate an effective amount of nitrous acid;
the nitrous acid initiates an oxidative coupling reaction producing the oxidative coupling product, and
wherein the oxidative coupling product comprises the two or more bonded quaternary aromatic corrosion inhibitors.

15. The method in accordance with claim 14, wherein the nitrite donor comprises greater than or equal to 1.0 mole of nitrite per mole of the two or more bonded quaternary aromatic corrosion inhibitors.

16. A method of forming a hydrocarbon-bearing formation for a stimulation operation, the method comprising the steps:
step a) providing a wellbore having a casing;
step b) assessing at least a first location and a second location for perforation of the casing;
step c) inserting a bottom hole assembly into the wellbore; the bottom hole assembly comprising a plug and a perforation tool and the bottom hole assembly being connected to a wireline;
step d) injecting an acidic composition into the wellbore; wherein the acidic composition is in direct contact with the perforation tool, the wireline and the casing;
step e) positioning and setting the plug in the wellbore at a position downhole but proximate to the first location;
step f) positioning the perforation tool at the first location;
step g) perforating the casing at the first location with the perforation tool thereby creating a first perforated area and a first cementitious debris;
step h) allowing the acidic composition to come into contact with the first perforated area and the first cementitious debris for a predetermined period of time to prepare the formation for the stimulation operation;
step i) moving the perforation tool up-hole to the second location;
step j) perforating the casing at the second location with the perforation tool thereby creating a second perforated area and a second cementitious debris;
step k) allowing the acidic composition to come into contact with the second perforated area and the second cementitious debris for a predetermined period of time to prepare the formation for the stimulation operation;
step l) removing the perforation tool from the wellbore;
wherein the acid composition comprises an acid and a corrosion inhibitor package, the corrosion inhibitor package comprising:
an effective amount of corrosion inhibiting oxidative coupling product and intensifier;
the oxidative coupling product comprises three or more bonded quaternary aromatic corrosion inhibitors resulting from an oxidative coupling reaction between at least one of a quaternary pyridinium and quaternary quinolinium; and wherein a bond between each of the three or more bonded quaternary aromatic corrosion inhibitors is a single carbon-carbon bond.

17. The method in accordance with claim 16, wherein the intensifier further comprises at least one of formaldehyde and glyoxal.

18. The method in accordance with claim 17, wherein the intensifier is in a concentration from about 500 ppm to 2,000 ppm.

19. The method in accordance with claim 16, wherein the intensifier further comprises formic acid.

20. The method in accordance with claim 19, wherein the intensifier is in a concentration from about 500 ppm to 10,000 ppm.

21. The composition in accordance with claim 16, wherein the oxidative coupling product comprises 750 to 5,000 ppm of the acid composition.

22. The method in accordance with claim 16, wherein the iodide concentration is about 200 to 2,000 ppm.

23. A method of forming a hydrocarbon-bearing formation for a stimulation operation, the method comprising the steps:
step a) providing a wellbore having a casing;
step b) assessing at least a first location and a second location for perforation of the casing;
step c) inserting a bottom hole assembly into the wellbore; the bottom hole assembly comprising a plug and a perforation tool and the bottom hole assembly being connected to a wireline;
step d) injecting an acidic composition into the wellbore; wherein the acidic composition is in direct contact with the perforation tool, the wireline and the casing;
step e) positioning and setting the plug in the wellbore at a position downhole but proximate to the first location;
step f) positioning the perforation tool at the first location;
step g) perforating the casing at the first location with the perforation tool thereby creating a first perforated area and a first cementitious debris;
step h) allowing the acidic composition to come into contact with the first perforated area and the first cementitious debris for a predetermined period of time to prepare the formation for the stimulation operation;
step i) moving the perforation tool up-hole to the second location;
step j) perforating the casing at the second location with the perforation tool thereby creating a second perforated area and a second cementitious debris;
step k) allowing the acidic composition to come into contact with the second perforated area and the second cementitious debris for a predetermined period of time to prepare the formation for the stimulation operation;
step l) removing the perforation tool from the wellbore;
wherein the acid composition comprises an acid and a corrosion inhibitor package, the corrosion inhibitor package comprising:
an effective amount of corrosion inhibiting oxidative coupling product and intensifier;
the oxidative coupling product comprising at least one of a quaternary pyridinium-pyridinium complex, quaternary pyridinium-quinolinium complex and quaternary quinolinium-quinolinium complex;
wherein the intensifier comprising an iodide donor; and
wherein the oxidative coupling product is the result of:
combining and mixing in a vessel a solvent, at least one quaternary aromatic corrosion inhibitor selected from at least one of quaternary pyridinium and quaternary quinolinium, a nitrite donor and acid;
the solvent is selected from at least one of a glycol ether, alcohol and water;
the nitrite donor in an amount to provide greater than or equal to 0.2 mole of nitrite per mole of the at least one quaternary aromatic corrosion inhibitor;
the acid in an amount sufficient to in-situ generate an effective amount of nitrous acid;
the nitrous acid initiates an oxidative coupling reaction producing the oxidative coupling product, and
wherein the oxidative coupling product comprises the two or more bonded quaternary aromatic corrosion inhibitors.

24. The method in accordance with claim 23, wherein the nitrite donor comprises greater than or equal to 1.0 mole of nitrite per mole of the at least one quaternary aromatic corrosion inhibitor.

* * * * *